United States Patent
Johnson et al.

(10) Patent No.: US 9,923,884 B2
(45) Date of Patent: Mar. 20, 2018

(54) IN-CIRCUIT SECURITY SYSTEM AND METHODS FOR CONTROLLING ACCESS TO AND USE OF SENSITIVE DATA

(71) Applicant: Apple Inc., Cupertino, CA (US)

(72) Inventors: Barry W. Johnson, Charlottesville, VA (US); Kristen R. O. Riemenschneider, Charlottesville, VA (US); David C. Russell, Virginia Beach, VA (US); Jonathan A. Tillack, Charlottesville, VA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/716,766

(22) Filed: May 19, 2015

(65) Prior Publication Data
US 2015/0347727 A1 Dec. 3, 2015

Related U.S. Application Data

(60) Continuation of application No. 13/947,313, filed on Jul. 22, 2013, now Pat. No. 9,124,930, which is a
(Continued)

(51) Int. Cl.
*G06F 21/75* (2013.01)
*H04L 29/06* (2006.01)
(Continued)

(52) U.S. Cl.
CPC ...... *H04L 63/0823* (2013.01); *G06F 17/3028* (2013.01); *G06F 21/10* (2013.01);
(Continued)

(58) Field of Classification Search
CPC ........... G06F 21/72; G06F 21/75; G06F 21/81
See application file for complete search history.

(56) References Cited

U.S. PATENT DOCUMENTS

| | | |
|---|---|---|
| 4,005,428 A | 1/1977 | Graham |
| 4,847,542 A | 7/1989 | Clark et al. |

(Continued)

FOREIGN PATENT DOCUMENTS

| | | | | |
|---|---|---|---|---|
| FR | WO 0039660 A1 * | 7/2000 | ........... | G06F 9/3879 |
| JP | H10-340254 A | 12/1996 | | |

(Continued)

OTHER PUBLICATIONS

U.S. Appl. No. 60/395,361, filed Jul. 12, 2002, Johnson et al.
(Continued)

*Primary Examiner* — David Pearson
(74) *Attorney, Agent, or Firm* — Morrison & Foerster LLP

(57) ABSTRACT

The invention disclosed herein is an in-circuit security system for electronic devices. The in-circuit security system incorporates identity credential verification, secure data and instruction storage, and secure data transmission capabilities. It comprises a single semiconductor chip, and is secured using industry-established mechanisms for preventing information tampering or eavesdropping, such as the addition of oxygen reactive layers. This invention also incorporates means for establishing security settings, profiles, and responses for the in-circuit security system and enrolled individuals. The in-circuit security system can be used in a variety of electronic devices, including handheld computers, secure facility keys, vehicle operation/ignition systems, and digital rights management.

25 Claims, 2 Drawing Sheets

Related U.S. Application Data continuation of application No. 12/555,480, filed on Sep. 8, 2009, now Pat. No. 8,495,382, which is a division of application No. 10/858,287, filed on Jun. 1, 2004, now Pat. No. 7,587,611.

(60) Provisional application No. 60/474,750, filed on May 30, 2003.

(51) Int. Cl.

| | | |
|---|---|---|
| *G06F 21/31* | (2013.01) | |
| *G06F 21/72* | (2013.01) | |
| *G06F 21/32* | (2013.01) | |
| *G06F 21/62* | (2013.01) | |
| *G06F 21/85* | (2013.01) | |
| *G06K 9/00* | (2006.01) | |
| *H04L 9/32* | (2006.01) | |
| *H04N 21/258* | (2011.01) | |
| *H04N 21/4415* | (2011.01) | |
| *G06F 17/30* | (2006.01) | |
| *G06K 9/62* | (2006.01) | |
| *G06F 21/10* | (2013.01) | |

(52) U.S. Cl.
CPC ............. *G06F 21/31* (2013.01); *G06F 21/32* (2013.01); *G06F 21/6209* (2013.01); *G06F 21/72* (2013.01); *G06F 21/75* (2013.01); *G06F 21/85* (2013.01); *G06K 9/00013* (2013.01); *G06K 9/00087* (2013.01); *G06K 9/6201* (2013.01); *H04L 9/3231* (2013.01); *H04L 63/06* (2013.01); *H04L 63/0861* (2013.01); *H04L 63/102* (2013.01); *H04N 21/25875* (2013.01); *H04N 21/4415* (2013.01); *G06F 2221/0771* (2013.01)

(56) References Cited

U.S. PATENT DOCUMENTS

| | | |
|---|---|---|
| 4,890,321 A | 12/1989 | Seth-Smith et al. |
| 4,993,068 A | 2/1991 | Piosenka et al. |
| 5,053,608 A | 10/1991 | Senanayake |
| 5,131,038 A | 7/1992 | Puhl et al. |
| 5,189,700 A | 2/1993 | Blandford |
| 5,280,527 A | 1/1994 | Gullman et al. |
| 5,396,215 A | 3/1995 | Hinkle |
| 5,448,045 A | 9/1995 | Clark |
| 5,469,506 A | 11/1995 | Berson et al. |
| 5,473,318 A | 12/1995 | Martel |
| 5,475,835 A | 12/1995 | Hickey |
| 5,481,265 A | 1/1996 | Russell |
| 5,483,261 A | 1/1996 | Yasutake |
| 5,488,204 A | 1/1996 | Mead et al. |
| 5,489,095 A | 2/1996 | Goudard et al. |
| 5,495,235 A | 2/1996 | Durinovic-Johri et al. |
| 5,526,428 A | 6/1996 | Arnold |
| 5,533,123 A | 7/1996 | Force et al. |
| 5,559,505 A | 9/1996 | McNair |
| 5,591,949 A | 1/1997 | Bernstein |
| 5,613,012 A | 3/1997 | Hoffman et al. |
| 5,615,277 A | 3/1997 | Hoffman |
| 5,715,403 A | 2/1998 | Stefik |
| 5,721,583 A | 2/1998 | Harada et al. |
| 5,721,777 A | 2/1998 | Blaze |
| 5,729,220 A | 3/1998 | Russell |
| 5,805,719 A | 9/1998 | Pare, Jr. et al. |
| 5,825,352 A | 10/1998 | Bisset et al. |
| 5,825,878 A | 10/1998 | Takahashi et al. |
| 5,832,207 A | 11/1998 | Little et al. |
| 5,835,079 A | 11/1998 | Shieh |
| 5,838,812 A | 11/1998 | Pare, Jr. et al. |
| 5,870,723 A | 2/1999 | Pare, Jr. et al. |
| 5,880,411 A | 3/1999 | Gillespie et al. |
| 5,894,550 A | 4/1999 | Thireit |
| 5,900,867 A | 5/1999 | Schindler et al. |
| 5,903,882 A | 5/1999 | Asay et al. |
| 5,920,640 A | 7/1999 | Salatino et al. |
| 5,952,641 A | 9/1999 | Korshun |
| 5,991,408 A | 11/1999 | Pearson et al. |
| 6,038,666 A | 3/2000 | Hsu et al. |
| 6,041,410 A | 3/2000 | Hsu et al. |
| 6,084,968 A | 7/2000 | Kennedy et al. |
| 6,101,477 A | 8/2000 | Hohle et al. |
| 6,119,096 A | 9/2000 | Mann et al. |
| 6,135,646 A | 10/2000 | Kahn et al. |
| 6,154,879 A | 11/2000 | Pare, Jr. et al. |
| 6,167,517 A | 12/2000 | Gilchrist et al. |
| 6,173,400 B1 | 1/2001 | Perlman et al. |
| 6,181,803 B1 | 1/2001 | Davis |
| 6,182,221 B1 | 1/2001 | Hsu et al. |
| 6,185,316 B1 | 2/2001 | Buffam |
| 6,188,391 B1 | 2/2001 | Seely et al. |
| 6,199,044 B1 | 3/2001 | Ackley et al. |
| 6,199,099 B1 | 3/2001 | Gershman et al. |
| 6,201,484 B1 | 3/2001 | Russell |
| 6,219,793 B1 | 4/2001 | Li et al. |
| 6,256,393 B1 | 7/2001 | Safadi et al. |
| 6,268,788 B1 | 7/2001 | Gray |
| 6,282,648 B1 | 8/2001 | Walker et al. |
| 6,282,649 B1 | 8/2001 | Lambert et al. |
| 6,289,445 B2 | 9/2001 | Ekner |
| 6,310,610 B1 | 10/2001 | Beaton et al. |
| 6,317,834 B1 | 11/2001 | Gennaro et al. |
| 6,323,846 B1 | 11/2001 | Westerman et al. |
| 6,327,376 B1 | 12/2001 | Harkin |
| 6,327,622 B1 | 12/2001 | Jindal et al. |
| 6,330,770 B1 | 12/2001 | Fukunaga et al. |
| 6,335,688 B1 | 1/2002 | Sweatte |
| 6,353,889 B1 | 3/2002 | Hollingshead |
| 6,356,905 B1 | 3/2002 | Gershman et al. |
| 6,366,682 B1 | 4/2002 | Hoffman et al. |
| 6,367,017 B1 | 4/2002 | Gray |
| 6,369,693 B1 | 4/2002 | Gibson |
| 6,396,544 B1 | 5/2002 | Schindler et al. |
| 6,401,085 B1 | 6/2002 | Gershman et al. |
| 6,424,285 B1 | 7/2002 | Perdue et al. |
| 6,441,770 B2 | 8/2002 | Russell |
| 6,449,367 B2 | 9/2002 | Van Wie et al. |
| 6,466,781 B1 | 10/2002 | Bromba et al. |
| 6,484,260 B1 | 11/2002 | Scott et al. |
| 6,487,662 B1 | 11/2002 | Kharon et al. |
| 6,490,680 B1 | 12/2002 | Scheidt et al. |
| 6,499,099 B1 | 12/2002 | Cho |
| 6,516,412 B2 | 2/2003 | Wasilewski et al. |
| 6,529,885 B1 | 3/2003 | Johnson |
| 6,532,298 B1 | 3/2003 | Cambier et al. |
| 6,535,871 B1 | 3/2003 | Romansky et al. |
| 6,581,161 B1 | 6/2003 | Byford |
| 6,609,198 B1 | 8/2003 | Wood et al. |
| 6,615,264 B1 | 9/2003 | Stoltz et al. |
| 6,618,806 B1 | 9/2003 | Brown et al. |
| 6,636,973 B1 | 10/2003 | Novoa et al. |
| 6,657,538 B1 | 12/2003 | Ritter |
| 6,662,166 B2 | 12/2003 | Pare, Jr. et al. |
| 6,668,332 B1 | 12/2003 | McNeil |
| 6,671,808 B1 | 12/2003 | Abbott et al. |
| 6,681,034 B1 | 1/2004 | Russo |
| 6,690,387 B2 | 2/2004 | Zimmerman et al. |
| 6,711,263 B1 | 3/2004 | Nordenstam et al. |
| 6,719,200 B1 | 4/2004 | Wiebe |
| 6,725,303 B1 | 4/2004 | Hoguta et al. |
| 6,728,881 B1 | 4/2004 | Karamchetty |
| 6,735,695 B1 | 5/2004 | Gopalakrishnan et al. |
| 6,751,734 B1 | 6/2004 | Uchida |
| 6,757,411 B2 | 6/2004 | Chau |
| 6,765,470 B2 | 7/2004 | Shinzaki |
| 6,766,040 B1 | 7/2004 | Catalano et al. |
| 6,775,776 B1 | 8/2004 | Vogt et al. |
| 6,786,397 B2 | 9/2004 | Silverbrook et al. |
| 6,819,219 B1 | 11/2004 | Bolle et al. |
| 6,832,317 B1 | 12/2004 | Strongin et al. |
| 6,836,843 B2 | 12/2004 | Seroussi et al. |

(56) References Cited

U.S. PATENT DOCUMENTS

| | | | |
|---|---|---|---|
| 6,839,688 B2 | 1/2005 | Drummond et al. | |
| 6,839,849 B1 * | 1/2005 | Ugon | G06F 9/3879 |
| | | | 712/E9.067 |
| 6,844,660 B2 | 1/2005 | Scott | |
| 6,848,052 B2 | 1/2005 | Hamid et al. | |
| 6,850,147 B2 | 2/2005 | Prokoski et al. | |
| 6,850,252 B1 | 2/2005 | Hoffberg | |
| 6,853,739 B2 | 2/2005 | Kyle | |
| 6,857,073 B2 | 2/2005 | French et al. | |
| 6,862,443 B2 | 3/2005 | Witte | |
| 6,870,946 B1 | 3/2005 | Teng et al. | |
| 6,870,966 B1 | 3/2005 | Silverbrook et al. | |
| 6,871,193 B1 | 3/2005 | Campbell et al. | |
| 6,871,287 B1 | 3/2005 | Ellingson | |
| 6,871,784 B2 | 3/2005 | Jayaratne | |
| 6,876,757 B2 | 4/2005 | Yau et al. | |
| 6,877,097 B2 | 4/2005 | Hamid et al. | |
| 6,879,243 B1 | 4/2005 | Booth et al. | |
| 6,879,966 B1 | 4/2005 | Lapsley et al. | |
| 6,880,749 B1 | 4/2005 | Green et al. | |
| 6,880,750 B2 | 4/2005 | Pentel | |
| 6,883,709 B2 | 4/2005 | Joseph | |
| 6,886,096 B2 | 4/2005 | Appenzeller et al. | |
| 6,886,101 B2 | 4/2005 | Glazer et al. | |
| 6,886,104 B1 | 4/2005 | McClurg et al. | |
| 6,888,445 B2 | 5/2005 | Gotfried et al. | |
| 6,898,577 B1 | 5/2005 | Johnson | |
| 6,901,154 B2 | 5/2005 | Dunn | |
| 6,901,155 B2 | 5/2005 | Xia et al. | |
| 6,901,266 B2 | 5/2005 | Henderson | |
| 6,901,382 B1 | 5/2005 | Richards et al. | |
| 6,940,391 B1 | 9/2005 | Ishikura et al. | |
| 6,985,502 B2 | 1/2006 | Bunton | |
| 7,015,894 B2 | 3/2006 | Morohoshi | |
| 7,076,663 B2 | 7/2006 | Kelley et al. | |
| 7,076,802 B2 | 7/2006 | Poisner | |
| 7,079,652 B1 | 7/2006 | Harris | |
| 7,093,298 B2 | 8/2006 | Rodriguez et al. | |
| 7,184,064 B2 | 2/2007 | Zimmerman et al. | |
| 7,188,362 B2 | 3/2007 | Brandys | |
| 7,204,425 B2 | 4/2007 | Mosher, Jr. et al. | |
| 7,255,269 B2 | 8/2007 | Debelleix | |
| 7,272,721 B1 | 9/2007 | Hellenthal | |
| 7,302,634 B2 | 11/2007 | Lucovsky et al. | |
| 7,420,546 B2 | 9/2008 | Abdallah et al. | |
| 7,525,537 B2 | 4/2009 | Abdallah et al. | |
| 7,587,611 B2 | 9/2009 | Johnson et al. | |
| 7,663,607 B2 | 2/2010 | Hotelling et al. | |
| 7,783,892 B2 | 8/2010 | Russell et al. | |
| 8,295,808 B2 | 10/2012 | Gehrmann et al. | |
| 8,327,152 B2 | 12/2012 | Russell et al. | |
| 8,479,122 B2 | 7/2013 | Hotelling et al. | |
| 8,495,382 B2 | 7/2013 | Johnson et al. | |
| 8,606,684 B2 | 12/2013 | Bi et al. | |
| 8,788,813 B2 | 7/2014 | Russell et al. | |
| 9,210,370 B1 | 12/2015 | Harvey et al. | |
| 2001/0011353 A1 | 8/2001 | Little et al. | |
| 2001/0015919 A1 | 8/2001 | Kean | |
| 2001/0035814 A1 | 11/2001 | Uchida | |
| 2001/0051996 A1 | 12/2001 | Cooper et al. | |
| 2002/0010861 A1 | 1/2002 | Matsuyama et al. | |
| 2002/0013898 A1 | 1/2002 | Sudia et al. | |
| 2002/0027494 A1 | 3/2002 | Watanabe et al. | |
| 2002/0104006 A1 * | 8/2002 | Boate | H04L 63/0853 |
| | | | 713/186 |
| 2002/0104872 A1 | 8/2002 | DeFelice et al. | |
| 2002/0124190 A1 | 9/2002 | Siegel et al. | |
| 2002/0146128 A1 * | 10/2002 | Mauro | H04L 29/06 |
| | | | 380/270 |
| 2002/0152278 A1 | 10/2002 | Pontenzone et al. | |
| 2002/0167394 A1 | 11/2002 | Couillard | |
| 2002/0186838 A1 | 12/2002 | Brandys | |
| 2003/0005336 A1 * | 1/2003 | Poo | G06F 21/32 |
| | | | 726/5 |
| 2003/0037006 A1 | 2/2003 | Maruyama et al. | |
| 2003/0041246 A1 | 2/2003 | Fischer | |
| 2003/0046554 A1 | 3/2003 | Leydier et al. | |
| 2003/0054879 A1 | 3/2003 | Schneier et al. | |
| 2003/0105725 A1 | 6/2003 | Hoffman | |
| 2003/0140232 A1 | 7/2003 | De Lanauze | |
| 2003/0172297 A1 | 9/2003 | Gunter | |
| 2003/0172299 A1 | 9/2003 | Gunter | |
| 2003/0182570 A1 | 9/2003 | Dellow | |
| 2003/0200453 A1 | 10/2003 | Foster et al. | |
| 2003/0236977 A1 | 12/2003 | Levas et al. | |
| 2004/0005059 A1 | 1/2004 | Suzuki et al. | |
| 2004/0032400 A1 | 2/2004 | Freeman et al. | |
| 2004/0049686 A1 * | 3/2004 | Chen | G06F 21/78 |
| | | | 713/186 |
| 2004/0054630 A1 | 3/2004 | Ginter et al. | |
| 2004/0054899 A1 | 3/2004 | Balfanz et al. | |
| 2004/0123113 A1 | 6/2004 | Mathiassen et al. | |
| 2004/0131188 A1 | 7/2004 | Wang et al. | |
| 2004/0148526 A1 | 7/2004 | Sands et al. | |
| 2004/0179692 A1 * | 9/2004 | Cheng | G06F 21/32 |
| | | | 380/278 |
| 2004/0236954 A1 * | 11/2004 | Vogt | G06F 21/32 |
| | | | 713/186 |
| 2005/0060232 A1 | 3/2005 | Maggio | |
| 2005/0160042 A1 | 7/2005 | Russell et al. | |
| 2006/0197753 A1 | 9/2006 | Hotelling | |

FOREIGN PATENT DOCUMENTS

| | | |
|---|---|---|
| JP | H09-54727 A | 2/1997 |
| JP | H10-307896 A | 11/1998 |
| JP | 2000-83019 | 3/2000 |
| JP | 2000-163031 A | 6/2000 |
| JP | 2001-103048 | 4/2001 |
| JP | 2002-342033 A | 11/2002 |
| JP | 2003-108473 A | 4/2003 |
| WO | WO 00/07326 A1 | 2/2000 |
| WO | WO 01/41032 A1 | 6/2001 |
| WO | WO 01/71671 | 9/2001 |

OTHER PUBLICATIONS

Microsoft Computer Dictionary, Fifth Edition, 2002, pp. 99, 277, and 485.

Microsoft Computer Dictionary, Microsoft Press 2002, Fifth Edition, "Disable" Definition; 4 pages.

Office Action for U.S. Appl. No. 10/858,287, dated Jun. 26, 2007.

Final Office Action for U.S. Appl. No. 10/858,287, dated Dec. 10, 2007.

Office Action for U.S. Appl. No. 10/858,287, dated Jul. 22, 2008.

Final Office Action for U.S. Appl. No. 10/858,287, dated Jan. 16, 2009.

Office Action for U.S. Appl. No. 12/555,480, dated Sep. 9, 2010.

Office Action for U.S. Appl. No. 12/555,480, dated May 26, 2011.

Office Action for U.S. Appl. No. 13/947,313, dated Jun. 16, 2014.

International Search Report and Written Opinion for PCT/US04/17272, dated Dec. 6, 2004, 4 pages.

Supplementary European Search Report for EP 04 75 3980, dated Jan. 23, 2009, 3 pages.

Office Action for European Patent Application No. EP 04 75 3980, dated May 14, 2009; 4 pages.

Office Action for European Patent Application No. EP 04 75 3980, dated Nov. 27, 2009, 5 pages.

Office Action for European Patent Application No. EP 04 75 3980, dated Feb. 23, 2012, 3 pages.

Office Action for Japanese Patent Application No. 2006-533548, dated Nov. 17, 2009.

Office Action for Japanese Patent Application No. 2006-533548, dated Oct. 5, 2010.

Office Action for Canadian Application No. 2,724,292, dated Apr. 30, 2013, 4 pages.

Office Action for Japanese Patent Application No. 2010-113165, dated Sep. 29, 2011, 9 pages.

Office Action from Canadian Application No. 2,527,836, dated Nov. 6, 2008; 2 pages.

(56) References Cited

OTHER PUBLICATIONS

Office Action for Canadian Application No. 2,527,836, dated Oct. 5, 2009, 2 pages.
Final Office Action in U.S. Appl. No. 10/858,336 dated Dec. 24, 2008, 20 pages.
Final Office Action dated Sep. 8, 2017, for U.S. Appl. No. 15/077,646, filed Mar. 22, 2016, 21 pages.
International Search Report and Written Opinion for PCT/US04/17264, dated Mar. 25, 2005, 4 pp.
Lee, S.K. et al. (Apr. 1985). "A Multi-Touch Three Dimensional Touch-Sensitive Tablet".
*Proceedings of CHI: ACM Conference on Human Factors in Computing Systems*, pp. 21-25.
Office Action for Canadian Patent Application No. 2,527,836 dated May 29, 2009, 2 pp.
Office Action for Canadian Patent Application No. 2,737,868, dated Dec. 17, 2012, 2 pp.
Office Action in European Patent Application No. 04 776 220.8, dated May 25, 2009, 4 pp.
Office Action in European Patent Application No. 04 776 220.8, dated Dec. 2, 2009, 4 pp.
Office Action in European Patent Application No. 04 776 220.8, dated Feb. 29, 2012, 6 pp.
Office Action in European Patent Application No. 04 776 220.8, dated Sep. 11, 2012, 5 pp.
Office Action in European Patent Application No. 04 776 220.8, dated Apr. 9, 2013, 4 pp.
Office Action in Japanese Patent Application No. 2010-205271, dated Mar. 26, 2012, 5 pp.
Office Action in U.S. Appl. No. 10/858,336 dated May 2, 2008, 16 pp.
Office Action in U.S. Appl. No. 10/858,336 dated Jun. 22, 2009, 20 pp.
Office Action in U.S. Appl. No. 10/858,336 dated Oct. 21, 2009, 5 pp.
Office Action in U.S. Appl. No. 12/861,121, dated Mar. 23, 2012, 12 pp.
Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.
Rubine, D.H. (May 1992). "Combining Gestures and Direct Manipulation," CHI '92, pp. 659-660.
Supplementary European Search Report for EP 04 77 6220.8, dated Jan. 28, 2009; 3 pages.
Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

\* cited by examiner

IN-CIRCUIT SECURITY SYSTEM AND METHODS FOR CONTROLLING ACCESS TO AND USE OF SENSITIVE DATA

RELATED U.S. APPLICATION DATA

This application is a continuation of U.S. patent application Ser. No. 13/947,313 filed on Jul. 22, 2013, which is a continuation of U.S. patent application Ser. No. 12/555,480 (now U.S. Pat. No. 8,495,382), filed Sep. 8, 2009, entitled "An In-Circuit Security System And Methods For Controlling Access To And Use Of Sensitive Data," which is a divisional of U.S. patent application Ser. No. 10/858,287 (now U.S. Pat. No. 7,587,611), filed Jun. 1, 2004, entitled "An In-Circuit Security System And Methods For Controlling Access To And Use Of Sensitive Data," which claims priority under U.S.C. § 119(e) of provisional patent application Ser. No. 60/474,750, filed May 30, 2003, entitled "Secure Biometric Identification Devices and Systems for Various Applications," each of which is hereby incorporated by reference in its entirety.

BACKGROUND OF THE INVENTION

Field of the Invention

The invention disclosed herein relates to the security of sensitive data stored, processed and distributed using electronic circuits. More particularly, the invention relates to the identification of individuals prior to accessing/using data, and the execution of security controls upon unauthorized attempts to access/use said data.

In recent years there has been an explosion of electronic devices that individuals may use for storing and transmitting sensitive data. In a low-security example, portable devices like a Palm™ or BlackBerry handled computer typically contain software for e-mail, along with options for storing credit cards, schedules, and other data. Most people wish to protect this information, but most handheld devices rely on their operating system to secure data. Unfortunately, the most common operating systems for these handheld computers were not designed with security as the main goal, and retrofitting basic security mechanisms has been clumsy.

A growing number of electronic devices, such as smart cards, are intended to specifically identify and authenticate users using the public key infrastructure, which requires secure storage of private keys. These devices are common in building security; for example, an individual with proper authorization to access a facility is assigned a smart card and an asymmetric key pair. A certificate authority generates a digital certificate for the public key, which is stored in the smart card. The private key is also stored on the smart card. When the individual places his smart card in the reader at the access point of the facility, the card transmits its digital certificate, and the reader challenges the card to encrypt a supplied string with the individual's private key. The reader obtains the public key out of the digital certificate and decrypts the private key-encrypted string to verify that the keys are related. This has an inherent problem because there is no guarantee that the individual using the private key is the assigned owner of the smart card. Furthermore, it is fairly simple for an experienced attacker to gain access to keys stored on the card.

Some handheld devices, such as Hewlett Packard's iPAQ PocketPC h5450, include biometric sensors for improved personal identification before allowing access to sensitive data. An individual possessing this device is instructed to enroll one or more of his fingerprints into the device's software. The enrolled fingerprint can be used as the sole password or as an alternative to a typed password. This type of device can be a substantial improvement on traditional data-access methods, because the biometric can be definitively tied to a single individual. However, if the sensitive data is stored or transmitted insecurely, the biometric authentication does not substantially hinder an attacker from probing the memory and compromising it.

These concerns have contributed to the marketing of products billed as 'secure memory' or 'secure processor'. These products are typically constructed with varying degrees of security; one lower degree is considered 'tamper-evident', in which an unskilled observer would see that someone had attempted to maliciously gain access to secured data. A higher level is 'tamper-resistant', in which the product actively resists tampering by use of a self-destruct mechanism, an impermeable substance that coats the components storing sensitive data such as a polymer-based coating or other so-called "conformal coating", or some other process. Furthermore, these products may encrypt input/output lines, mislabel parts, and perform other types of obfuscation.

Description of the Related Art

U.S. Pat. No. 5,533,123 to Force, et al., discloses programmable distributed personal security inventions. The patent teaches a "Secured Processing Unit" ("SPU") comprising an "SPU chip" and a microprocessor designed especially for secure data processing. The invention integrates keys, encryption and decryption engines, and algorithms in the SPU of the invention. Purportedly, the security process is portable and easily distributed across physical boundaries. The invention is based upon three interdependent subsystems. The first subsystem of the invention is a detector subsystem, which alerts an SPU to the existence and to the character of a security attack. A second subsystem is a filter subsystem that correlates data from multiple detectors, then assesses the severity of the attack against the risk to the SPU's integrity, both to its secret data and to the design of the SPU itself. A third subsystem is a response subsystem for generating responses, or countermeasures, calculated by the filters to be most appropriate under the circumstances, in order to deal with the attack(s) detected. Force does not disclose identity credential verification within the SPU.

U.S. Pat. No. 5,825,878 to Takahashi discloses a secure embedded memory management unit for a microprocessor. A microprocessor memory management apparatus is used for encrypted instruction and data transfer from an external memory. Physical security is obtained by embedding the direct memory access controller on the same chip with a microprocessor core, an internal memory, and encryption/decryption logic. Data transfer to and from an external memory takes place between the external memory and the memory controller of the memory management unit. All firmware to and from the external memory is handled on a page-by-page basis. Since all of the processing takes place on buses internal to the chip, detection of clear unencrypted instructions and data is prevented. Takahashi does not disclose any capability, anticipation, intention, or provision for including identity credential verification on the management unit or within the microprocessor core.

U.S. Pat. No. 5,832,207 to Little, et al., teaches a secure module including a microprocessor and a co-processor. The electronic module is provided with at least one microprocessor and a co-processor deployed into a single integrated circuit. The electronic module can be contained in a small form factor housing. The electronic module provides secure bi-directional data communication via a data bus. The electronic module may include an integrated circuit including a microprocessor and a co-processor adapted to handle 1,024-bit modulo mathematics primarily aimed at RSA calculations. The electronic module is preferably contained in a small token-sized metallic container. The module preferably communicates via a single wire data bus using a one-wire protocol. Little et al. does not disclose personal identification systems.

U.S. Pat. No. 5,894,550 to Thireit discloses a method of implementing a secure program in a microprocessor card, and a microprocessor card including a secure program. The invention claims that a program can be made secure relative to a CPU. The invention accomplishes this by storing in a first memory zone predetermined address functions that are directly executable by the CPU. The first memory zone is then write-protected, then the program is stored in a second memory zone in the form of a series of instructions that are executable within the second memory zone or that activate functions contained in the first memory zone.

U.S. Pat. Nos. 5,481,265, 5,729,220, 6,201,484 and 6,441,770 to Russell detail a handheld device used to authenticate persons and said device to remote computer systems. The invention further includes a "kill switch" or "kill signal" enabling the computer system to remotely disable the handheld device and restrict further omissions. However, the system is primarily targeted at local area network applications and does not anticipate or suggestion broader applications.

BRIEF SUMMARY OF THE INVENTION

The invention disclosed herein is an in-circuit security system for electronic devices. The in-circuit security system incorporates identity credential verification, secure data and instruction storage, and secure data transmission capabilities. It comprises a single semiconductor chip, lowering component cost and reducing board space. The in-circuit security system chip is secured using mechanisms for preventing information tampering or eavesdropping, such as the addition of oxygen reactive layers. This invention also incorporates means for establishing security settings and profiles for the in-circuit security system and enrolled individuals. The in-circuit security system can be used in a variety of electronic devices, including handheld computers, secure facility keys, vehicle operation/ignition systems, and digital rights management.

BRIEF DESCRIPTION OF DRAWINGS

Master Reference Numeral List

FIG. 1 is a schematic view of a sample embodiment of the in-circuit security system.
FIG. 2 is a schematic view of the components of a sample handheld computer using the in-circuit security system.
FIG. 3 is a schematic view of the components of an electronic lock mechanism using the in-circuit security system.

DETAILED DESCRIPTION OF THE INVENTION

The invention described herein is an in-circuit security system by which pre-enrolled individuals may access sensitive data or perform actions on sensitive data in an environment that is fully monitored and protected. The in-circuit security system requires full authentication of individuals and can perform a variety of programmed responses in the event that pre-established authentication standards are not met. The in-circuit security system includes secure transmission of sensitive data to remote devices.

Figure 1:
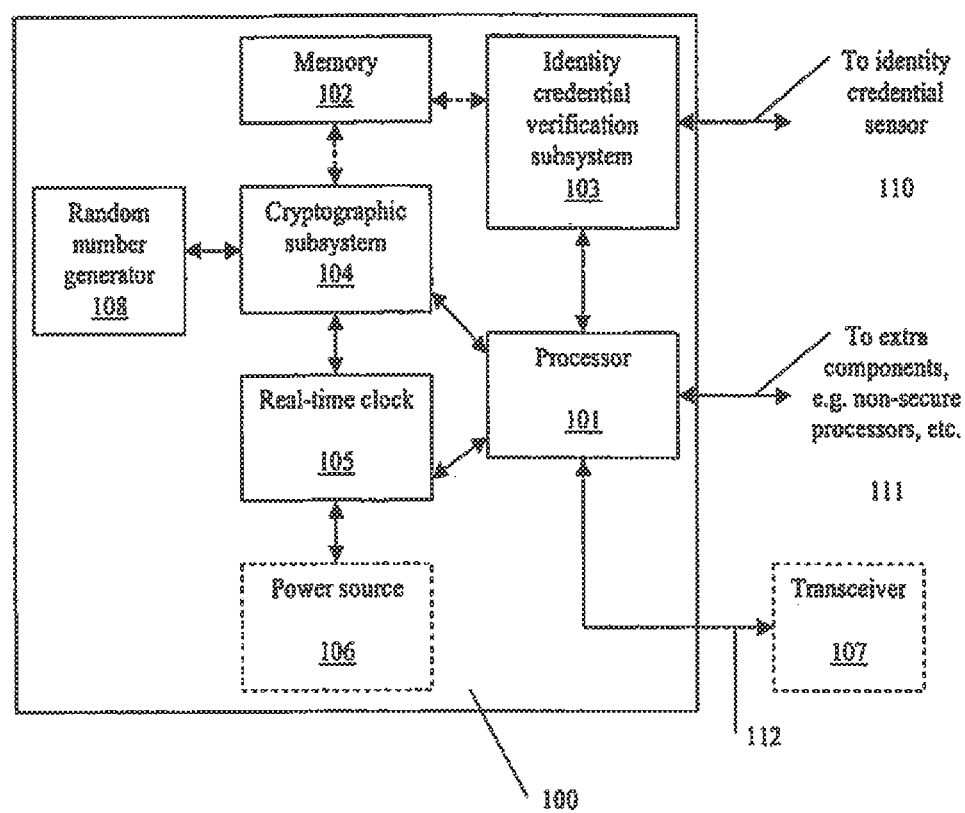
FIG. 1: Sample embodiment of in-circuit security system components
100 In-circuit security system
101 Processor
102 Memory
103 Identity credential verification subsystem
104 Cryptographic subsystem
105 Real-time clock
106 Power source (OPTIONAL)
107 Transceiver (OPTIONAL)
108 Random number generator
110 Connection to identity credential sensor
111 Connection to peripheral components
112 Connection to antenna or cables

The in-circuit security system comprises several components combined securely into a single, secure chip. As seen in FIG. 1, the primary embodiment of the in-circuit security system 100 comprises a processor 101, a memory 102, a real-time clock 105, and a random number generator 108. The in-circuit security system 100 also includes a cryptographic subsystem 104 and an identity credential verification subsystem 103. These subsystems may be logical, physical, or some combination thereof, and are described in further detail below. In typical embodiments, the in-circuit security system 100 will also contain a power source 106, such as a battery, in order to maintain power to the real-time clock 105. During manufacture, the in-circuit security system 100 receives a unique, one-time programmable electronic identification code that can be read but cannot be altered or removed. The in-circuit security system 100 also preferably provides multiple input/output interfaces 110-112 for connection to optional internal/external components, such as transceivers 107, antennae, identity credential sensors, non-secure processors, etc.

The processor 101 is the main control component; it is responsible for loading and executing instructions to control the various components of the chip, as well as performing user-requested tasks. The memory 102 is coupled to the processor 101. It comprises both volatile and non-volatile components and can be used to store instructions or data, such as security settings or profiles and cryptographic keys. The application of these security settings is discussed below. The real-time clock 105 is also coupled to the processor 101 and is used to maintain an accurate time, which can be used in cryptographic signing, audit records, or other transactions. The real-time clock 105 may be connected to a power source 106 in order to constantly maintain time. If the in-circuit security system 100 does not include the power source 106, the real-time clock 105 must be cognizant of power disconnects, which means that it can no longer provide an accurate time.

The fourth component of the in-circuit security system 100 is a random number generator 108. The random number generator 108 is used for seeding cryptographic algorithms, and may use any of established methods for guaranteeing sufficient randomness. The random number generator 108 may be included as part of the cryptographic subsystem 104 or may be a standalone component coupled to the subsystem 104. The cryptographic subsystem 104 is a dedicated system for performing encryption and decryption, digital signing and digital signature verification. In one embodiment the subsystem 104 is responsible for storing cryptographic keys in its own memory; in another, the subsystem is coupled to and uses the main memory 102 of the in-circuit security system 100. Additionally, one primary embodiment of the invention uses a cryptographic acceleration chip or component as the cryptographic subsystem 104. Alternative embodiments are coupled to and use the main processor 101 as the cryptographic engine.

The identity credential verification subsystem 103 is used to determine the identity of an individual attempting to use the in-circuit security system 100 and identify his associated security privileges. The identity credential verification subsystem 103 performs identity credential acquisition, analysis, storage and matching. In the primary embodiment of the invention, the identity credential verification subsystem 103 uses digital representations of fingerprints as the identity credential. In this embodiment the identity credential verification subsystem 103 performs fingerprint image acquisition, and template generation, storage, and matching. The identity credential verification subsystem 103 may use the main processor 101 of the in-circuit security system 100 for credential processing actions or may use its own specialized processor. Similarly, it may employ its own memory for credential storage or use the main memory 102 of the in-circuit security system 100. The in-circuit security system 100 provides one or more connections 110 to external components for credential sensing, such as a fingerprint sensor.

The in-circuit security system 100 incorporates an interface 112 to a transceiver 107, antenna, wire, or other remote communication device that is coupled to the processor 101. This component is used for transmission of data from one device to another. All sensitive data that is to be transmitted from the in-circuit security system 100 can be encrypted using the cryptographic subsystem 104, so it is not necessary to place a transceiver 107 within the secure boundaries of the in-circuit security system 100. However, in some embodiments it may prove to be convenient to incorporate the transceiver 107 into the chip. In these embodiments the interface 112 would be from the transceiver to an antenna, wire, or other communication device. In a primary embodiment of the invention, the transmission technology is radio-frequency identification (RFID), such as the ISO 14443 A/B or 15693 standards. In another embodiment the in-circuit security system 100 uses Bluetooth or infrared technology. Other embodiments provide a combination of these technologies or others. In alternative embodiments, it may be useful to use a wired technology, such as a serial or USB connection. The in-circuit security system 100 preferably provides external connections 112 for requisite connectors, cables or antennae.

The authentication of individuals allows the in-circuit security system 100 to associate an individual with specific security privileges within the system. For example, one user may be enrolled and identified as a typical user with no ability to reset the system 100, while an alternate user may be identified as an administrator with that ability. Additionally, the in-circuit security system 100 may be programmed to perform a variety of both temporary and permanent responses to security events. For example, a specified number of access denials within a particular time interval may cause the in-circuit security system 100 to suspend all actions or halt the real-time clock 105 until reset by an enrolled administrator. Alternatively, an attempt to crack open the case of the chip housing the in-circuit security system 100 may result in permanent erasure of memory 102, or destruction of other components. The in-circuit security system 100 may also be programmed to allow an enrolled individual to directly disable or destroy components.

As described above, the in-circuit security system 100 is combined into one secured chip with three major interfaces: an interface to a credential sensing mechanism, such as a fingerprint sensor, an interface to peripheral components, such as non-secure processors or user-interface devices; and an interface to a transceiver or antenna for remote communications. Other interfaces are strictly prevented. The chip may use one or more physical security measures to prevent information eavesdropping. These obfuscation techniques include use of "potting", oxygen-reactive layers, photosensors, Hall effect sensors, and circuits that monitor clock frequency and/or reset frequency.

The system 100 may additionally perform algorithmic analysis of interface traffic. For example, fingerprint images received from a fingerprint sensor may be analyzed by the identity credential verification subsystem 103; if the identity credential verification subsystem 103 repeatedly receives the exact same bit pattern representation of fingerprints, it is possible that someone is deliberately placing that bit pattern on the interface. Similarly, if the identity credential verification subsystem 103 receives bit patterns that are an exact rotation or other permutation of a previously received image, again someone may be altering the contents of the interface.

Figure 2:
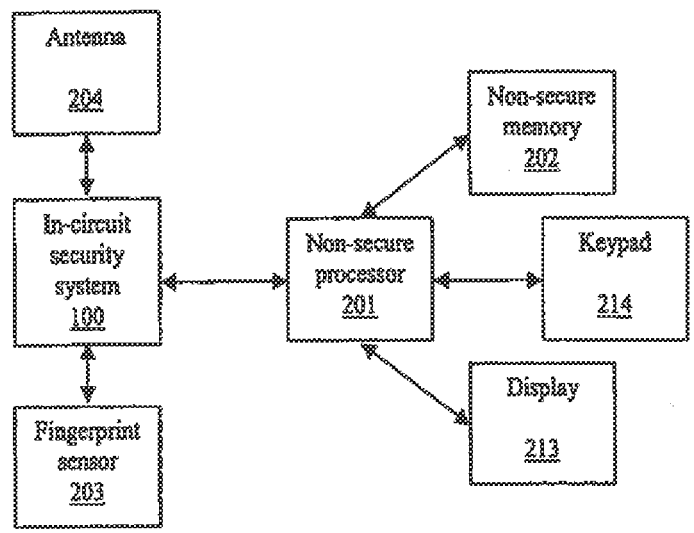
FIG. 2: Handheld computer with the in-circuit security system
100 In-circuit security system
201 Non-secure processor
202 Non-secure memory
203 Fingerprint sensor
204 Antenna
213 Display
214 Keypad

The in-circuit security system can be used as a standalone component for security applications or as one of multiple components within an electronic device. In one use of the invention, a handheld computer is equipped with the in-circuit security system 100, as seen in FIG. 2. The computer further comprises a display 213, a keypad 214, a non-secure processor 201 and memory 202, and a fingerprint sensor 203. Additionally, for embodiments in which the in-circuit security system 100 includes a transceiver 107 that uses cellular wireless technology, the handheld computer also incorporates an antenna 204.

The primary user of the handheld computer enrolls a fingerprint, a digital certificate, and an associated private key into the in-circuit security system 100. The fingerprint is stored in the identity credential verification subsystem 103 and is used to authorize use of the private key associated with the digital certificate. The digital certificate may be stored in the cryptographic subsystem 104 or the main memory 102 of the in-circuit security system 100.

The individual typically uses the handheld computer to transmit and receive e-mail. He requires the in-circuit security system 100 to digitally sign his e-mail, which requires accessing the stored private key associated with his fingerprint. He selects his e-mail program, and types an e-mail for transmission using the keypad 214. The keypad 214 is coupled to the processor 201, which receives the data and creates an appropriate message packet for transmission.

Once created, the message packet is sent to the in-circuit security system 100 for further processing.

The processor 101 of the in-circuit security system 100 receives the message packet and analyzes the established security settings for transmission of e-mail. Because the in-circuit security system 100 is configured to require digital signing of e-mail prior to transmission, the individual must first authenticate his fingerprint to the identity credential verification subsystem 103. The biometric authentication is required to prevent unauthorized users from encrypting e-mail with a private key that is not theirs. The processor 101 signals the identity credential verification subsystem 103 to wait for a new fingerprint sample from the fingerprint sensor 203, and signals the non-secure processor 201 to provide a visual prompt to the user on the display 213. After the user places his finger on the fingerprint sensor 203 it sends the new fingerprint image to the identity credential verification subsystem 103. The identity credential verification subsystem 103 analyzes the image, generates a template, and compares it to the enrolled fingerprint template. If the two match, the identity credential verification subsystem 103 sends a signal to the processor 101 that the individual is authorized to use the stored private key.

The processor 101 now sends the e-mail message to the cryptographic subsystem 104 and instructs the cryptographic subsystem 104 to sign the message. This typically involves generating a hash of the message and encrypting it with the private key. The cryptographic subsystem 104 may also include a timestamp generated by the real-time clock, the unique device identifier, or other data, prior to the hash. The cryptographic subsystem 104 now sends the signed e-mail message back to the processor 101. The processor 101, in turn, sends the signed e-mail to the cellular transceiver 107 for transmission to a remote recipient.

Figure 3:
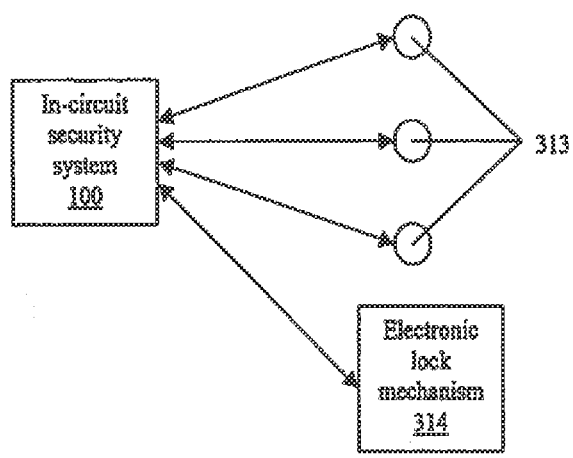
FIG. 3: Electronic lock mechanism with the in-circuit security system
100 In-circuit security system
313 LEDs
314 Electronic lock mechanism

In a second embodiment of the invention, the in-circuit security system 100 is embedded into an electronic door locking mechanism that is used to control access to a secure facility. As seen in FIG. 3, the system comprises the in-circuit security system 100 with a wired connection to the electronic door lock 314, a fingerprint sensor 203, and a series of light emitting diodes (LEDs) 313 that are used to provide visual feedback to the user. Individuals access the secure facility by demonstrating enrollment of their fingerprint into the in-circuit security system 100. The security settings of the in-circuit security system 100 are configured to shut down the entire locking mechanism on a pre-specified number of failed attempts within a pre-specified time span. This is example of security parameters and settings that are stored within the memory 102.

An enrolled individual wishes to enter the facility. One LED 313 glows green, signaling that the fingerprint sensor 303 is ready. The individual places his finger on the sensor 203, which generates a fingerprint image and sends it to the identity credential verification subsystem 103. The identity credential verification subsystem 103 generates a fingerprint template and compares it to the enrolled fingerprints. The new fingerprint template matches an existing template, so the identity credential verification subsystem 103 sends the individual's unique identifier to the processor 101. The processor 101 accesses the memory 102, which stores security privileges associated with enrolled individuals. The individual who is currently authenticated is authorized to enter the secure facility alone, so the processor 101 sends a signal to the transceiver 107 to trigger the lock 314 to release.

Now an individual who has not been pre-enrolled into the identity credential verification subsystem 103 attempts to enter the secure facility. The individual places his finger on the fingerprint sensor 203, which sends an image of the fingerprint back to the identity credential verification subsystem 103. The fingerprint is compared to all of the enrolled fingerprints, and no match is found because the individual is not enrolled. The identity credential verification subsystem 103 records the date, time, and other requisite characteristics of the failed access attempt, and flashes a red LED 313 to show that access has been denied. The identity credential verification subsystem 103 also notifies the appropriate process within the processor 101 that an access failure has occurred.

The individual now tries another, un-enrolled finger. The identity credential verification subsystem 103 records the subsequent failure, and notifies the processor 101 that there has been another failure. When the number of failed attempts reaches the pre-established limit, the identity credential verification subsystem 103 again notifies the processor 101 that a failure has occurred. At this point, the processor 101 applies the security settings and places the electronic lock mechanism 314 in a state where it cannot be unlocked unless it is reset by a recognized authority; in a primary embodiment this would be implemented using a "fail-secure" lock and would involve disconnecting a power source. Alternative actions can occur to put the lock 314 into this state as necessary. The processor 101 may also put the identity credential verification subsystem 103 into a state where it does not accept new fingerprints, create images, or perform matching. As desired by the regulator of the secure facility, the processor 101 may instruct the identity credential verification subsystem 103 to delete any enrolled fingerprint images. These are all examples of programmable security settings.

While the description above refers to particular embodiments of the present invention, it will be understood that many modifications may be made without departing from the spirit thereof. The accompanying claims are intended to cover such modifications as would fall within the true scope and spirit of the present invention.

We claim:

1. A hardware-based in-circuit security system for an electronic device, the hardware-based in-circuit security system comprising at least one hardware processor, comprising:
    a secure processor configured to communicate with a second processor;
    a cryptographic subsystem coupled to the secure processor, wherein the cryptographic subsystem is further configured to perform a cryptographic operation;
    an identity credential verification subsystem (ICVS) coupled to the secure processor, the ICVS is further coupled to an interface that is coupled to a biometric sensor, the interface configured to receive identity credential information from the biometric sensor of the electronic device in response to a request from the secure processor to verify an identity credential using identity information received from the biometric sensor;
        wherein the secure processor is configured to request that the ICVS verify an identity credential using the identity credential information received from the biometric sensor using at least one enrolled identity credential, in response to the secure processor receiving an interrupt in response to a request from the second processor requesting a security service,
        the ICVS is configured to signal the secure processor in response to the ICVS completing an identity credential verification process using the identity credential information received by the ICVS from the biometric sensor, the secure processor is configured to trigger an interrupt to the second processor that the identity credential has been verified, in response to a signal from the ICVS that the identity credential has been verified, and wherein the secure processor is configured to trigger an interrupt to the second processor that the identity credential verification failed, in response to the secure processor receiving a predetermined number of signals from the ICVS that the identity credential verification failed.

2. The in-circuit security system of claim 1, wherein the received identity credential information comprises biometric data including data representative of one of: a fingerprint, a facial pattern, a human retinal pattern, a heartbeat pattern, a human DNA pattern, or an iris pattern.

3. The in-circuit security system of claim 1, wherein receipt by the secure processor of the interrupt from the second processor requesting the security service comprises one of:

the secure processor receiving an interrupt from the second processor that is processed by the secure processor to fulfill the security service request, or the secure processor receiving a message from the second processor and the receipt of the message generates an interrupt to the secure processor that is processed by the secure processor to fulfill the security service request.

4. The in-circuit security system of claim 1, wherein the secure processor communicates with the second processor via an interface that comprises shared memory and an interrupt signal that triggers the secure processor to perform an identity credential verification.

5. The in-circuit security system of claim 1, wherein the cryptographic subsystem is coupled to a random number generator, the cryptographic subsystem is configured to receive a random number from the random number generator as a seed for a cryptographic algorithm, and wherein a cryptographic operation comprises one of generating an encrypted message for transmission from the secure processor to the second processor, decryption, digital signing, or digital signature verification.

6. The in-circuit security system of claim 1, wherein the secure processor signals the identity credential verification subsystem to wait to receive identity credential information from a sensor of the electronic device.

7. The in-circuit security system of claim 1, wherein the secure processor comprises the cryptographic subsystem and the secure processor comprises the identity credential verification subsystem.

8. A non-transitory computer-readable medium programmed with executable instructions that, when executed by a processing system, perform operations comprising:

receiving, by an identity credential verification subsystem (ICVS) of an in-circuit security system, identity credential information comprising biometric data in response to a request from a secure processor to verify an identity credential using the identity credential information received from a biometric sensor;

receiving, by a secure processor communicatively coupled to a second processor, an interrupt triggered by the request from the second processor requesting that an identity verification be performed on the identity credential information received by the ICVS;

requesting, by the secure processor, that the ICVS verify the identity credential using identity the credential information received from the biometric sensor and using at least one enrolled identity credential, in response to the secure processor receiving the signal from the second processor requesting a security service, sending, by the ICVS, to the secure processor, a signal indicating success or failure of the verification of the identify credential information;

triggering an interrupt to the second processor, by the secure processor, that the identity credential has been verified, in response to the signal from the ICVS that the identity credential has been verified, and triggering an interrupt to the second processor, by the secure processor, that the identity credential verification failed, in response to the secure processor receiving a predetermined number of signals from the ICVS that the identity credential verification failed.

9. The medium of claim 8, wherein the received identity credential information comprises biometric data including data representative of one of: a fingerprint, a facial pattern, a retinal pattern, a heartbeat pattern, a human DNA pattern, or an iris pattern.

10. The medium of claim 8, wherein receiving by the secure processor of the interrupt triggered by the request from the second processor that requests the security service comprises one of:

the secure processor receiving an interrupt from the second processor that is processed by the secure processor to fulfill the security request, or the secure processor receiving a message from the second processor and the receipt of the message generates an interrupt to the secure processor that is processed by the secure processor to fulfill the security service request.

11. The medium of claim 8, wherein receiving an interrupt comprises:

receiving, by the secure processor via an interface having an interrupt controller and shared memory with the second processor, an interrupt signal that triggers the secure processor to perform an identity credential verification.

12. The medium of claim 8, wherein the cryptographic subsystem is further coupled to a random number generator and the cryptographic subsystem is configured to receive a random number from the random number generator as a seed for a cryptographic algorithm used in performing a cryptographic operation, wherein a cryptographic operation comprises one of generating an encrypted message for transmission from the secure processor to the second processor, decryption, digital signing, or digital signature verification.

13. The medium of claim 8, further comprising:

retrieving an enrolled credential from a secure memory coupled to the secure processor.

14. A computer-implemented method comprising:

receiving, by an identity credential verification subsystem (ICYS) of an in-circuit security system, identity credential information comprising biometric data in response to a request from a secure processor to verify an identity credential using the identity credential information received from a biometric sensor:

receiving, by a secure processor communicatively coupled to a second processor, an interrupt triggered by the request from the second processor that an identity verification be performed on the identity credential information received by the ICYS;

requesting, by the secure processor, that the ICYS verify the identity credential using the identity credential information received from the biometric sensor and using at least one enrolled identity credential, in response to the secure processor receiving the interrupt triggered in response to a request from the second processor requesting a security service, sending, by the ICYS, to the secure processor, a signal indicating success or failure of the verification of the identify credential information, triggering an interrupt to the second processor, by the secure processor, that the identity credential has been verified, in response to the signal from the ICYS that the identity credential has been verified, and triggering an interrupt the second processor, by the secure processor, that the identity credential verification failed, in response to the secure processor receiving a predetermined number of signals from the ICYS that the identity credential verification failed.

15. The method of claim 14, wherein the received identity credential information comprises biometric data including data representative of one of: a fingerprint pattern, a facial pattern, a retinal pattern, a heartbeat pattern, a human DNA pattern, or an iris pattern.

16. The method of claim 14, wherein receiving by the secure processor of the interrupt triggered from the second processor that requests the security service comprises one of:

the secure processor receiving an interrupt from the second processor that is processed by the secure processor to fulfill the security request, or the secure processor receiving a message from the second processor and the receipt of the message generates an interrupt to the secure processor that is processed by the secure processor to fulfill the security service request.

17. The method of claim 14, wherein receiving an interrupt triggered by the request from the second processor comprises:

receiving, by the secure processor via an interface having an interrupt controller and shared memory with the second processor, an interrupt signal that triggers the secure processor to perform an identity credential verification.

18. The method of claim 14, wherein the cryptographic subsystem is further coupled to a random number generator and the cryptographic subsystem is configured to receive a random number from the random number generator as a seed for a cryptographic algorithm used in performing a cryptographic operation, wherein a cryptographic operation comprises one of generating an encrypted message for transmission from the secure processor to the second processor, decryption, digital signing, or digital signature verification.

19. The method of claim 14, wherein
the secure processor signals the identity credential subsystem to wait to receive identity credential information from the sensor of the electronic device.

20. The method of claim 14 further comprising performing a cryptographic operation, by a cryptographic subsystem coupled to the secure processor, using at least one of the received identity credential information or an enrolled identity credential.

21. The method of claim 14, further comprising:
determining that the ICVS has repeatedly received an exact same bit pattern representation of biometric data; and
signaling the secure processor in response to the determining.

22. The method of claim 14, further comprising:
signaling the ICVS, by the secure processor, to wait for a identity credential information from the biometric sensor.

23. The method of claim 14, further comprising:
in response to determining that the ICVS has signaled that the identity credential verification has failed a predetermined number of times, putting the ICVS into at least one of the following states:
the ICVS does not accept new identity credential information received from the biometric sensor;
the ICVS does not create new images from identity credential information received from the biometric sensor; or
the ICVS does not perform matching of identity credential information to one or more stored templates.

24. The method of claim 14, further comprising:
in response to determining that the ICVS has signaled that the identity credential verification has failed a predetermined number of times, instructing the ICVS to delete one or more enrolled identity credentials.

25. The method of claim 14, wherein the ICVS stores a template corresponding to biometric data in a secure memory.

* * * * *

UNITED STATES PATENT AND TRADEMARK OFFICE
CERTIFICATE OF CORRECTION

PATENT NO. : 9,923,884 B2  
APPLICATION NO. : 14/716766  
DATED : March 20, 2018  
INVENTOR(S) : Barry W. Johnson et al.

Page 1 of 1

It is certified that error appears in the above-identified patent and that said Letters Patent is hereby corrected as shown below:

In the Claims

At Column 10, Claim 14, Line number 58, please delete "ICYS" and replace with -- ICVS --.
At Column 10, Claim 14, Line number 67, please delete "ICYS" and replace with -- ICVS --.
At Column 11, Claim 14, Line number 1, please delete "ICYS" and replace with -- ICVS --.
At Column 11, Claim 14, Line number 8, please delete "ICYS" and replace with -- ICVS --.
At Column 11, Claim 14, Line number 13, please delete "ICYS" and replace with -- ICVS --.
At Column 11, Claim 14, Line number 18, please delete "ICYS" and replace with -- ICVS --.
At Column 12, Claim 25, Line number 44, please delete "14" and replace with -- 1 --.

Signed and Sealed this  
Twenty-ninth Day of May, 2018

Andrei Iancu  
*Director of the United States Patent and Trademark Office*